United States Patent [19]

Mathur

[11] Patent Number: 5,198,497
[45] Date of Patent: Mar. 30, 1993

[54] POLYOLEFIN, RUBBER AND EVA-MALEIC ANHYDRIDE TERPOLYMER BLEND

[75] Inventor: Saubhagya C. Mathur, Longivew, Tex.

[73] Assignee: Eastman Kodak Company, Rochester, N.Y.

[21] Appl. No.: 814,166

[22] Filed: Dec. 30, 1991

[51] Int. Cl.$^5$ .............. C08L 23/08; C08L 23/14; C08L 23/16; C08K 5/01

[52] U.S. Cl. ................ 525/108; 523/437; 523/438

[58] Field of Search ............... 525/108; 523/437, 438

[56] References Cited

U.S. PATENT DOCUMENTS

| | | | |
|---|---|---|---|
| 3,037,954 | 6/1962 | Gessler et al. | 260/29.8 |
| 3,758,643 | 9/1973 | Fischer | 260/897 A |
| 3,806,558 | 4/1974 | Fischer | 260/897 A |
| 3,835,201 | 9/1974 | Fischer | 260/897 A |
| 3,862,106 | 1/1975 | Fischer | 260/897 A |
| 4,059,651 | 11/1977 | Smith et al. | 260/897 A |
| 4,141,863 | 2/1979 | Coran et al. | 260/3 |
| 4,232,132 | 11/1980 | Grigo et al. | 525/222 |
| 4,311,628 | 1/1982 | Abdou-Sabet et al. | 260/33.6 |
| 4,613,533 | 9/1986 | Loomis et al. | 525/222 |
| 4,707,519 | 11/1987 | Forti et al. | 525/133 |
| 4,758,629 | 7/1988 | Deyrup et al. | 525/194 |
| 5,037,888 | 8/1991 | Vanderbilt | 525/108 |

*Primary Examiner*—Robert E. Sellers
*Attorney, Agent, or Firm*—Mark A. Montgomery; William P. Heath, Jr.

[57] ABSTRACT

Dynamically vulcanized multi-component polymer blends are prepared containing thermoplastic polyolefins, non-vulcanized rubber, and ethylene-vinyl acetate-maleic anhydride terpolymer crosslinked in situ. The dynamically vulcanized blend is prepared from a crosslinkable composition containing thermoplastic polyolefin, rubber, non-crosslinked ethylene-vinyl acetate-maleic anhydride terpolymer, epoxy, and tertiary amine. The crosslinkable composition is crosslinked at an elevated temperature for sufficient time to crosslink the ethylene-vinyl acetate maleic anhydride terpolymer without substantial decomposition forming uniform dispersion of small particles of rubber and ethylene-vinyl acetate-terpolymer in the thermoplastic polyolefin matrix.

14 Claims, No Drawings

POLYOLEFIN, RUBBER AND EVA-MALEIC ANHYDRIDE TERPOLYMER BLEND

This invention relates to multi-component blends that have been dynamically vulcanized having thermoplastic and elastomer properties. More particularly the present invention relates to a multi-component blend of thermoplastic, polyolefin, and two different rubbers providing a unique balance of properties.

BACKGROUND OF THE INVENTION

Elastomeric materials are known and have been used in numerous applications where resistance to permanent deformation is important. Elastomeric materials are generally prepared by mixing an elastomer with a curing agent and then curing the mixture in a mold at elevated temperatures for a period of time. The cured elastomer is then resistant to permanent deformation but yet can no longer be melt processed or reused without degradation.

Thermoplastic materials are also known and can be molded or otherwise shaped and reprocessed at temperatures above their melting or softening point. Thermoplastic materials, however, are not resistant to permanent deformation, particularly at elevated temperatures.

Thermoplastic elastomers are also known and exhibit both thermoplastic and elastomeric properties like elastomers. Shaped articles that are resistant to permanent deformation can be formed from thermoplastic elastomers by extrusion, injection molding or compression molding without the time-consuming cure step required with conventional elastomeric materials, thereby improving thruput and reducing energy cost. Additionally, since these materials are thermoplastic, scrap and the articles themselves can be reprocessed.

The preparation of thermoplastic elastomeric compositions based on the thermoplastic polymers and vulcanized rubbers, according to the method known as "dynamic vulcanization" is known in the art and is described in particular in U.S. Pat. Nos.3,037,954; 3,758,643; 3,806,558; 3,835,201; and 3,862,106. Other methods of preparing thermoplastic elastomers by cross-linking an elastomer, usually in the presence of a thermoplastic, are also described in the patents summarized below: U.S. Pat. Nos. 4,059,651, 4,141,863, 4,311,628, and 4,707,519 disclose phenolic induced cross-linking of blends of ethylene-propylene-diene terpolymer (EPDM) in the presence of olefin resins; U.S. Pat. No. 3,957,919 discloses peroxide induced cross-linking of blends of polyethylene and EPDM in the presence of polypropylene; U.S. Pat. No. 4,232,132 discloses the peroxide induced cross-linking of ethylene vinyl acetate copolymer in the presence of polypropylene; U.S. Pat. No. 4,613,533 discloses the cross-linking of ethylene vinyl acetate polymers in the presence of vinyl chloride; and U.S. Pat. No. 4,758,629 discloses the cross linking of ethylene-acrylate-glycidyl acrylate terpolymer in the presence of polyolefins using known cross linking agents for epoxy resins.

Improved thermoplastic elastomeric compositions are disclosed in U.S. Pat. No. 5,037,888. This patent discloses a composition containing polyolefin and ethylene-vinyl-acetate-maleic anhydride terpolymer that is cross-linked in situ with an epoxy compound catalyzed with a tertiary amine.

SUMMARY OF THE INVENTION

The present invention is directed to unique thermoplastic elastomeric compositions and process for the preparation thereof. These thermoplastic elastomeric compositions are processable as thermoplastics and have a unique balance of elastomeric and impact properties while maintaining good high temperature properties.

According to the present invention, the multi-component thermoplastic elastomers are dynamically vuncanized multi-component polymer blends that comprise (a) about 50 to 90 weight % of a thermoplastic polyolefin, (b) about 5 to 45 weight % of a rubber that does not vulcanize in the presence of epoxy compounds, and (c) about 5 to 30 weight % of at least one ethylene-vinyl acetate-maleic anhydride terpolymer, wherein the ethylene vinyl-acetate-maleic anhydride terpolymer has been dynamically vulcanized in the presence of the other components in situ using a an epoxy cross-linking agent.

The thermoplastic elastomer is prepared by mixing the above (a), (b), and (c) with an epoxy cross-linking agent to form a cross linkable composition that is then subjected to a temperature for a sufficient time to substantially cross-link the ethylene vinyl acetate-maleic anhydride terpolymer and form a uniform dispersion of small particles of the cross-linked terpolymer and non vulcanized rubber in the polyolefin matrix.

DETAILED DESCRIPTION OF THE INVENTION

The dynamically vulcanized multi-component blend of the present invention has a unique combination of good elastomeric and impact properties while maintaining low brittleness and good low and high temperature properties.

The process for producing the multi component thermoplastic elastomer comprises
(1) mixing
(a) about 50 to 90 weight % of at least one thermoplastic polyolefin based on the total of (a), (b) and (c);
(b) about 5 to 45 weight % based on the total of (a), (b) and (c) of at least one rubber that does not vulcanize in the presence of epoxy compounds, and
(c) about 5 to 30 weight % based on tht total of (a), (b) and (c) of at least one ethylene-vinyl acetate-maleic anhydride terpolymer having a number average molecular weight of about 1,000 to 1,000,000 g/mole;
(d) about 1 to 20 parts per 100 parts (c) of at least one epoxy of the formula

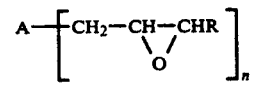

in which n is between 2 and 6 inclusive, A is a polyfunctional group of the valency of n, and R is a hydrocarbon radical or hydrogen; and
(e) at least one tertiary amine wherein the ratio of epoxy to tertiary amine is about 1000:1 to 1:1,
(2) heating this mixture at a sufficient temperature for a sufficient time to substantially cross-link (c) without substantial decomposition, and form a uniform dispersion of small particles of (b) and cross-linked (c) in the polyolefin matrix (a).

The amount of the thermoplastic polyolefin (a) used in the compositions and process of the present invention is about 50-90 weight % based on the totals of (a), (b), and (c). An amount below about 50% results in excessive lowering of tensile strength and an amount above about 90% does not provide enough elastomeric properties to be useful as a thermoplastic elastomeric material. This amount of polyolefin (a) is preferably about 60-70 weight % with an amount around 70 weight % being most preferred. The thermoplastic polyolefin is preferably selected from polymers and copolymers of alpha-olefins having from 2-10 carbon atoms and is more preferably selected from polyethylenes, polypropylenes, ethylene-alpha-olefin copolymers, propylene alpha-olefin copolymers, and mixtures thereof. The thermoplastic polyolefin used in the present invention preferably has a flow rate of 0.1 to 30 g/10 min. at 230° C. (ASTM method D1238-85) and is selected from polypropylenes and copolymers of polypropylene in which propylene is a major monomer. Suitable examples of these include isotactic polypropylene and ethylene-copolymers such as impact resistant polymers of ethylene and propylene. The most preferred thermoplastic polyolefin of the present invention is an impact resistant polymer of propylene and ethylene having an ethylene content of 15-20% by weight that preferably has a flow rate between 10 and 25 g/10 min. An impact resistant polymer of propylene and ethylene is most preferred due to better impact properties.

The amount of the rubber (b) used in the compositions and process of the present invention that does not vulcanize in the presence of the epoxy compounds is between about 5 and 45 weight %. An amount below about 5% does not significantly improve impact strength and an amount above 45 weight % results in a significant loss of high temperature properties. This amount is preferably about 10-20 weight % with an amount of 15 weight % rubber being most preferred. This rubber (uncross-linked) is preferably an ethylene-propylene-diene terpolymer that preferably contains about 50-80 weight % ethylene, about 20-40 weight % propylene, and about 3-10 weight % diene. More preferably, about 60-70 weight % ethylene, about 25-35 weight % propylene, and about 5-7 weight % diene. The diene used in the rubber that is an ethylene-propylene-diene terpolymer is preferably ethylidene norbornene.

The rubber (b) used in the present invention preferably contains an extender such as a paraffinic oil extender. The amount of oil extender used in the rubber (b) is preferably about 30-60 weight % with about 30 to 40 weight % oil extender being most preferred. An extender is useful in the present invention in that it reduces the actual amount of rubber needed to affect the impact properties of the composition. An amount below about 30 weight % does not sufficiently extend the expensive rubber whereas an amount above 60% begins to significantly affect the rubber's performance.

The amount of the ethylene-vinyl acetate-maleic anhydride terpolymer used in the present invention is about 5-30 weight %. An amount below about 5 weight % does not provide enough cross-linked material and thus does not significantly impart thermoplastic properties to the blend whereas an amount above 30 weight % results in inferior high temperature and tensile properties. The amount of the ethylene-vinyl acetate-maleic anhydride terpolymer used in the present invention is preferably about 10-20 weight %, more preferably about 12-18 weight %, with an amount of about 15 weight % being most preferred.

The ethylene-vinyl acetate-maleic anhydride terpolymer is crosslinked to form small particles of ethylene-vinyl acetate-maleic anhydride terpolymer in the thermoplastic polyolefin matrix. The rubber (b) that is not crosslinkable in the presence of epoxy compounds is also in the form of small particles in the thermoplastic polyolefin matrix. These particles of uncross-linked rubber and cross-linked ethylene-vinyl acetate-maleic anhydride terpolymer present in the thermoplastic polyolefin matrix are preferably very small as large particles result in an inferior combination of impact and elastomeric paropertis. These particles preferably have an average particle size below about 50 μm, more preferably below about 20 μm with an average particle size below about 10 μm being most preferred. The small particle sizes are ensured by adequate mixing during the crosslinking-heating phase.

The ethylene-vinyl acetate-maleic anhydride terpolymer preferably contains at least 50 mol % ethylene repeating units up to 40 mol % vinyl acetate repeating units and up to 10 mol % maleic anhydride repeating units. The ethylene-vinyl acetate-maleic anhydride terpolymer preferably contains about 5-30 mol % vinyl acetate repeating units with about 10-15 mol % being most preferred. The ethylene-vinyl acetate-maleic anhydride terpolymer preferably contains about 0.2 to 5 mol % maleic anhydride repeating units with about 0.2 to 2 mol % being most preferred. The ethylene-vinyl acetate-maleic anhydride terpolymer (before cross-linking) preferably has a melt index of 5 to 50 g/10 min at 190° C., more preferably about 5 to 20 g/10 min with a melt index of about 20 g/10 min being most preferred. The melt index of the ethylene-vinyl acetate-maleic anhydride terpolymer is preferably as close as possible to the melt index of the base thermoplastic polyolefin to provide for better mixing. The composition of the present invention is prepared generally using about 1-20 parts per hundred parts of (c) ethylene-vinyl acetate-maleic anhydride terpolymer of at least one epoxy (d) of the formula

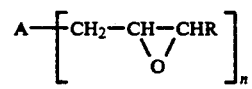

in which n is between 2 and 6 inclusive, A is a polyfunctional group of the valency of n, and R is a hydrocarbon radical or hydrogen. The epoxy is preferably of the formula in which N is 2, 3 or 4, A is a polyhydroxide group, and R is hydrogen. The preferred epoxys are selected from polyglycidyl ethers of polyhydroxy compounds, more preferably diglycidyl ethers of diols with Bisphenol-A diglycidyl ether (I) being most preferred.

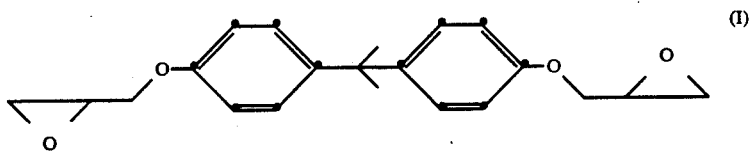

The preferred amount of epoxy used in the preparation of the composition of the present invention is such that the equivalent ratio $$\frac{\text{Epoxide equivalents in the epoxy}}{\text{Anhydride equivalents in the terpolymer}}$$

is between about 0.1 and 1. This equivalent ratio is more preferably between about 0.5 and 1.0.

A tertiary amine is used as a catalyst in combination with the epoxy. The tertiary amine used as the catalyst in the preparation of the thermoplastic elastomer is preferably nonvolatile at processing conditions (crosslinking conditions) and is present in a concentration per epoxy between about 1:100 and 1:10, preferably between about 5:100 and 10:100. The tertiary amine used in the present invention is preferably selected from triethylamine, tributylamine, dimethylaniline, and diazabicyclo[2.2.2]octane.

Inert filler can also be added to the composition of the present invention. Examples of such fillers include carbon black, silica, titanium dioxide, colored pigments, clay, zinc oxide and the like. The fillers may improve certain properties such as heat resistance, solvent resistance, and dimensional stability. The amount of filler can be varied depending on the balance of physical properties desired. Typically 0 to 20 percent filler can be used.

Antioxidants can also be added to the composition of the present invention. Examples of effective antioxidants include, tris(di-t-butyl-p-hydroxy-benzyl)trimethylbenzene (available as Ionox 330 from Shell Chemical), alkylated bisphenol (available as Naugawhite from Uniroyal) zinc bibutyldithiocarbamate (available as Butyl Zimate from R. T. Vanderbilt), and 4,4'-methylene bis(2,6-di-tert-butylphenol) (Ethyl 702), tetrakis[methylene(3,5-di-tert-butyl-4-hydroxyhydrocinnamate)methane] (available as Irganox 1010 from Ciba Geigy), lauryl stearyl thiodipropionate (Plastanox 1212), and dilauryl 3,3'-thiodipropionate (Plastanox DLTDP), and 2,6-di-tert-butyl-p-cresol (BHT).

The method of compounding or crosslinking (c) in situ by heating the mixture at a temperature and a time sufficient to crosslink can be conducted according to any method acceptable so long as the uniform dispersion of small crosslinked ethylene-vinyl acetate-maleic anhydride terpolymer and non-crosslinked rubber occurs in the thermoplastic polyolefin matrix. Such compounding methods include Banbury mixing, twin and single screw extrusion, and twin-roll mill compounding. The compounding can be carried out in single or multiple stages. The rubber can be compounded with the thermoplastic polyolefin to obtain a concentrate. The rubber concentrate, ethylene-vinyl acetate-maleic anhydride terpolymer and the thermoplastic polyolefin can then be compounded to obtain a uniform blend which then can be dynamically vulcanized. The most preferred method of compounding includes the following steps:

(i) preparation of a rubber concentrate,
(ii) preparation of a uniform blend of the rubber concentrate, ethylene-vinyl acetate-maleic anhydride terpolymer and the thermoplastic polyolefin, and
(iii) dynamic vulcanization.

The most preferred method of compounding is by twin-screw extrusion and the catalyst is preferably injected along the extruder barrel at a point downstream from the injection point of the epoxy.

Feeding of the epoxy compound and the catalyst in the extruder can be performed by any method known in the art of reactive extrusion. The epoxy and catalyst can be injected at different zones on the extruder using a solution and injection pumps. Epoxy compounds can be dissolved in any suitable organic solvent that has good solubility for the compound and can be easily stripped from the blend under vacuum. Suitable examples of such solvents include toluene, xylene, acetone, and mixtures thereof, with toluene being most preferred. Similar solvents can be chosen for the catalysts with the mixture of toluene and acetone being the most preferred catalyst solvent. The temperature of compounding is selected so that the crosslinking reaction can proceed at a reasonable rate with respect to the mixing operations. This temperature is preferably about 170° to 250° C., preferably about 175° to 195° C., with about 180° to 190° C. being most preferred. The residence time is preferably between about 30 sec and 15 min.

EXAMPLES

Materials Used: In all the following working examples the different materials used (unless specified differently in the examples) were as follows:

(a) Polyolefin component: Polypropylene Impact resistant polymer obtained from Eastman Chemical Company (ECC) under the trademark Tenite P6-004 prepared by sequential polymerization of propylene and ethylene, was used as the polyolefin component. The composition and the physical properties of the polypropylene are summarized in Table 1.

TABLE 1

| Polypropylene Impact Resistant Polymer (Tenite P6-004) | |
|---|---|
| Ethylene Content (wt. %) | 16.1 |
| Propylene Content (wt. %) | 83.9 |
| Melt FLow Rate (gm/10 min) | 15.6 |
| Density (gm/cc) | 0.9015 |
| Tensile Strength at Break (psi) | 2780 |
| Tensile Strength at Yield (psi) | 3435 |
| Elongation at Break (%) | 395 |
| Elongation at Yield (%) | 9 |
| Flexural Modulus (×100,000 psi) | 1.26 |
| Hardness (Rockwell R) | 58 |
| Heat Deflection Temperature at 264 psi (°C.) | 47.8 |
| Heat Deflection Temperature at 66 psi (°C.) | 82.2 |
| Unnotched Izod at −29° C. (ft. lb/in.) | 25.6 |
| Gardner Impact at −29° C. | 196 |

(b) Ethylene propylene diene rubber: The rubber, hereinafter called EPDM, used was obtained from Montedison under the trademark Dutral TER533/E2. The composition and the physical property data for the rubber are shown in Table 2. The rubber was used as a concentrate containing 60 percent EPDM and 40% polypropylene impact copolymer obtained from ECC under the trademark Tenite P6-003 containing 13% ethylene, 87% propylene and having a melt flow rate of 18 g/10 min. The concentrate had a flow rate of 0.98 gms/10 min at 230° C.

TABLE 2

| Ethylene-Propylene-Diene Rubber Dutral TER/E2 | |
|---|---|
| Ethylene Content (wt. %) | 62 |
| Propylene Content (wt. %) | 31 |
| Ethylene Norbornene Content (wt. %) | 6.7 |
| Paraffinic Oil (parts per 100 parts rubber) | 50 |

(c) Ethylene-vinyl acetate-maleic anhydride terpolymer: The terpolymer, hereinafter called EVAMA, was prepared by high pressure-free radical polymerization using free-radical chemistry known in the art. The composition and the other property data are summarized in Table 3.

TABLE 3

| Ethylene-Vinyl Acetate-Maleic Anhydride Terpolymer | |
|---|---|
| Vinyl Acetate Content (wt. %) | 15 |
| Maleic Anhydride Content (wt. %) | 0.2 |
| Melt Index at 190° C. (gm/10 min) | 22 |

(d) Epoxy compound: An epoxy obtained from Shell Chemical Company under the trademark Epon 828 was used as the epoxy compound for cross-linking. Epon 828 was used as a 40 weight percent solution of the diglycidyl ether of Bisphenol A in toluene.

(e) Catalyst: A tertiary amine diazabicyclo[2.2.2]octane obtained from Aldrich Chemical Company under the trademark Dabco was used as the catalyst. It was used as a 10 weight percent solution in a mixture of 60 volume percent toluene and 40 volume percent acetone.

Physical Property Measurement: Test specimens were molded on an Arburg molding machine and measurements of various physical properties were carried out according to the ASTM procedures listed in Table 4. The extent of cross-linking was estimated from the measurement of Gel content which is defined as:

Gel Content % = (Weight of insoluble fraction/weight of test specimen) × 100 where the weight of insoluble fraction is obtained by extracting a known amount of sample in refluxing mineral spirits for 24 hours.

TABLE 4

| ASTM Test Procedures | |
|---|---|
| Physical Properties | ASTM Test |
| Flexural Modulus | D-790-66 |
| Tensile Strength | D-663 |
| Density | D-1505 |
| Melt Flow Rate | D-1238-85 |
| Vicat Softening Point | D-1525 |
| Izod Impact Strength | D-256 |
| Heat Deflection Temperature | D-648 |
| Rockwell Hardness | D-785 |
| Shore Hardness | D-2240 |
| Compression Set | D-395 |

Blend Preparation: In all the working examples the blends were prepared according to the following procedure: Initially desired quantities of EVAMA, EPDM concentrate and polypropylene were tumble blended for 15 minutes in a drum tumbler. The tumble blended mixture was then fed to a 25 mm twin screw extruder at a feed rate of 20 pounds per hour and was pelletized using a strand pelletizer. The extrusion settings for this step, hereinafter called Initial blending, are shown in Table 5.

TABLE 5

| Extrusion Conditions for Initial Blend | |
|---|---|
| Temperature Profile | |
| Zone 1 (°C.) | 190 |
| Zone 2 (°C.) | 200 |
| Zone 3 (°C.) | 200 |
| Zone 4 (°C.) | 200 |
| Zone 5 (°C.) | 200 |
| Zone 6 (°C.) | 200 |
| Die Zone (°C.) | 200 |
| Screw RPM | 150 |

Dynamic Vulcanization: The initial blend obtained from the above step was fed again through a 25 mm twin screw extruder. Epon 828 solution was injected through an injection port (2) along the extruder barrel downstream from the feed hopper and the Dabco solution was injected through an injection port (3) downstream from the injection point of the Epon 828 solution. Vacuum was applied through the last port before the extruder die. The injection pumps and the feeders were calibrated to obtain desired amounts of Epon 828 and Dabco in the blend. The conditions for different blends are summarized in Table 6.

EXAMPLE 1

This example produces a dynamically vulcanized blend with unique combination of properties. 1135 gms of EPDM concentrate, 2724 gms of tenite polypropylene P6-004 and 681 gms of EVAMA were tumble blended in a drum tumbler for 15 minutes. The resulting mixture contained 70% polypropylene (total of Tenite polypropylene P6 004 and tenite polypropylene P6-003) 15% EVAMA, and 15% EPDM. The mixture was extruded through a 25 mm twin screw extruder according to the method described earlier as "initial blending". The extrusion conditions are summarized in Table 5. The extruded blend was pelletized using a strand pelletizer. The pellets were charged into the 25 mm twin screw extruder and dynamic vulcanization was carried out by injecting Epon 828 solution through port 2 and Dabco solution through port 3 as described under "dynamic vulcanization" earlier. The feed rates were chosen to obtain complete cross-linking of EVAMA. The extrusion conditions are summarized in Table 6. The extruded blend was pelletized in a strand pelletizer. Test specimens were injection molded and physical properties were measured according to the ASTM procedures listed in Table 4. Gel content was determined as described earlier. The physical properties are summarized in Table 7.

EXAMPLE 2—COMPARATIVE

This example produces a blend without dynamic vulcanization. A blend with a composition similar to the one in Example 1 was prepared essentially according to Example 1 except without carrying out the dynamic vulcanization. The extrusion conditions are summarized in Table 6. The physical properties of the blend are summarized in Table 7.

EXAMPLE 3—COMPARATIVE

This example produces a blend without any EVAMA. 2270 gms of EPDM concentrate and 2270 gms of Tenite polypropylene P6 004 were tumble blended for 15 minutes to obtain a blend mixture consisting of 70 percent polypropylene and 30 percent EPDM. The blend was extruded through a 25 mm twin screw extruder and pelletized according to procedures described in Example 2. The extrusion conditions are summarized in Table 6 and the physical properties are summarized in Table 7.

EXAMPLE 4—LESS PREFERRED

This example produces a blend with higher EVAMA content than Example 1 but has similar extent of vulcanization. 1135 gms of EPDM concentrate, 2043 gms of Tenite polypropylene P6-004 and 1362 gms of EVAMA were tumble blended for 15 minutes to obtain a mixture containing 55% polypropylene, 30% EVAMA, and 15% EPDM. The mixture was charged to a 25 mm twin screw extruder to obtain initial blending as described in Example 1. Dynamic vulcanization in the 25 mm twin screw extruder was carried out according to the procedure described in Example 1. The Epon 928 feed was chosen to obtain the same extent of cross-linking as in Example 1. The extrusion conditions are summarized in Table 6 and the physical properties are summarized in Table 7.

EXAMPLE 5—LESS PREFERRED

This example produces a blend with higher EPDM content than Example 1 but has similar extent of cross-linking. 2270 gms of EPDM concentrate, 1589 gms of Tenite polypropylene P6 004 and 681 gms of EVAMA were tumble blended for 15 minutes to obtain a composition containing 55% polypropylene, 30% EPDM, and 15% EVAMA. The mixture was charged to a 25 mm twin screw extruder to obtain initial blending as described in Example 1. Dynamic vulcanization in the 25 mm twin screw extruder was carried out according to the procedure described in Example 1. The Epon 828 feed was chosen to obtain the same extent of cross-linking as in Example 1. The extrusion conditions are summarized in Table 6 and the physical properties are summarized in Table 7.

EXAMPLE 6—COMPARATIVE

This example blend was prepared without using EPDM. Tenite polypropylene P6 004 at a 40 weight % and EVAMA (composition: 20% vinyl acetate and 2% maleic anhydride with melt index of 129 g/10 min) at 60 wt. % were used. The blend was prepared on the twin screw extruder as described in Example 1. EPON 828 solution feed was kept at the same level (wt. % of EVAMA) as in Example 1 This would increase the extent of crosslinking as the amount of maleic anhydride in the EVAMA used here is higher than in Example 1. The physical properties obtained are shown in Table 8.

EXAMPLE 7—COMPARATIVE

A Banbury BR mixer was charged with 525 g polypropylene copolymer (from ECC under the trademark Tenite P6MAU-001, melt flow rate=8.0 g/10 min, 10.8% ethylene content); and 525 g EVAMA terpolymer (14.2% vinyl acetate and 1.5% maleic anhydride content, melt index=12.5 g/10 min at 190° C., acid number=7.5 mg KOH/g). The mixture was agitated so that the temperature of the mixture rose above the melting point to 180° C. To this molten mixture or blend was added 17.5 g of EPON 828 solution and 1.7 g of DABCO solution as a catalyst.

The mixture was agitated at 180° C. for 10 min, and 10 g of antioxidant (Irganox 1010) was added. The mixture was agitated another 5 min at 180° C. and then dumped. The dumped material was cut into small pieces, granulated, and injection molded using standard techniques into test specimens for measurement of physical properties.

The physical properties are shown in Table 8.

TABLE 7

| Blend Composition | Physical Properties of the Blends | | | | |
| --- | --- | --- | --- | --- | --- |
|  | 1 | 2 | 3 | 4 | 5 |
| Melt Flow Rate (gms/10 min) | 2.31 | 15.5 | 2.56 | 1.17 | 1.47 |
| Density (gms/cc) | 0.9 | 0.8962 | 0.8947 | 0.9091 | 0.9013 |
| Tm (°C.) | 82.5/115/158.4 | 86.3/158.9 | 114.8/157.6 | 85.7/114.7/159 | 83.7/115.4/157.4 |
| Tc (°C.) | 112/35.8/70.3 | 112.2/70.9 | 110.7/97.4 | 112.1/98.5/70.3 | 109.8/95.3/67.6 |
| Gel Content, % | 17.5 | 0 | 0 | 18.7 | 13.5 |
| Tensile Strength at Break (psi) | 1900 | 1960 | 1570 | 1740 | 1290 |
| Tensile Strength at Yield (psi) | 1600 | 1550 | 1390 | 1320 | 1060 |
| Elongation at Break (%) | 410 | 680 | 380 | 430 | 330 |
| Elongation at Yield (%) | 21 | 21 | 70 | 33 | 31 |
| Flexural Modulus (×100,000 psi) | 0.57 | 0.57 | 0.48 | 0.39 | 0.33 |
| Hardness (Shore D) | 61 | 61 | 58 | 56 | 52 |
| Brittleness Temp. (°C.) | −52 | −52 | −53 | −52 | −53 |
| Heat Deflection Temp. at 264 psi (°C.) | 42 | 38 | 39 | 37 | 34 |
| Heat Deflection Temp. at 66 psi (°C.) | 63 | 58 | 59 | 50 | 50 |
| Vicat Softening Point (°C.) | 98 | 96 | 97 | 81 | 82 |
| Gardner Impact Strength at 29° C. (in-lb) | 195 | 197 | 202 | 196 | 190 |

TABLE 6

| Blend Example | Conditions for the Initial Blending | | | | |
| --- | --- | --- | --- | --- | --- |
|  | 1 | 2 | 3 | 4 | 5 |
| Zone 1 °C. | 190 | 190 | 190 | 190 | 190 |
| Zone 2 °C. | 200 | 200 | 200 | 200 | 200 |
| Zone 3 °C. | 200 | 200 | 200 | 200 | 200 |
| Zone 4 °C. | 200 | 200 | 200 | 200 | 200 |
| Zone 5 °C. | 200 | 200 | 200 | 200 | 200 |
| Zone 6 °C. | 200 | 200 | 200 | 200 | 200 |
| Die Temperature °C. | 200 | 200 | 200 | 200 | 200 |
| Melt Temperature °C. | 210 | 210 | 210 | 210 | 211 |
| Melt Pressure | 80 | 100–110 | 70–80 | 80–90 | 80–90 |

TABLE 6-continued

Conditions for the Initial Blending

| Blend Example | 1 | 2 | 3 | 4 | 5 |
|---|---|---|---|---|---|
| Extrusion (psi) | | | | | |
| Amps | 2.1 | 2.75 | 1.9 | 1.9 | 2 |
| Vacuum | −30 | — | — | −30 | −30 |
| Screw RPM | 100 | 150 | 150 | 100 | 100 |
| Feed Rate (gms/min) | 60 | 144 | 145 | 60 | 60 |
| Epon Feed (gms/min) | 0.55 | 0 | 0 | 0.55 | 0.55 |
| Dabco Feed (% of Epon/min) | 20 | 0 | 0 | 20 | 20 |

TABLE 8

| PROPERTY | Example 7 | Example 6 |
|---|---|---|
| Melt Flow Rate, g/10 min | 2.26 | |
| Melting Point, °C. | 89.5/161.5 | |
| Tc, °C. | 135/92 | |
| Gel, % | 22 | 27 |
| Density, g/cc | 0.9243 | |
| Tensile @ Break, psi | 1440 | 1310 |
| Tensile @ Yield, psi | 1540 | 1140 |
| Flexural Modulus, ×10−5, psi | 0.45 | 0.33 |
| Vicat Softening Point, °C. | 86 | 73 |
| Heat Deflection Temperature @ 264 psi, °C. | 44 | 31 |
| Heat Deflection Temperature @ 66 psi, °C. | 58 | 45 |
| Rockwell Hardness, R Scale | 41 | |
| Shore Hardness, D Scale | 53 | 53 |
| Notched Izod @ 23° C. | NB | NB |
| Compression Set @ 23° C. | 48 | |
| Compression Set @ 70° C. | 48 | |

The results in Tables 7 and 8 show that the blend in Example 2 has slightly better elastomeric properties (higher elongation at break) compared to the blend in Example 1 but has lower yield strength and inferior high temperature properties (lower heat deflection temperature and Vicat softening points) compared to Example 1. The blend in Example 3 has lower tensile strength, lower heat deflection temperature and lower Vicat softening point compared to the blend in Example 1. The blends in Examples 4 and 5 are similarly inferior to the blend in Example 1. Blends in Examples 6 and 7 have significantly inferior tensile strength properties as well as poor high temperature properties compared to the blend in Example 1. Comparison of the physical properties in Tables 7 and 8 indicate clearly that a superior combination of elastomeric properties, impact strength, heat deflection temperature, Vicat softening point and low brittleness temperature was obtained for the blend composition in Example 1 which means that this material is unique in retaining good elastomeric properties while being useful at elevated temperatures which are higher than those for the comparative blends. Less preferred Examples 4 and 5 had good impact strength but the elastomeric properties and high temperature properties are slightly inferior.

The invention has been described in detail with particular reference to preferred embodiments thereof, but it will be understood that variations and modifications can be effected within the spirit and scope of the invention.

I claim:

1. A multicomponent blend comprising (a) about 50 to 90 wt. % of a thermoplastic polyolefin; (b) about 5 to 45 wt. % of a rubber other than said thermoplastic polyolefin that does not vulcanize in the presence of epoxy compounds, and (c) about 5 to 30 wt. % of ethylene-vinyl acetate-maleic anhydride terpolymer, all percentages based on the total of (a), (b) and (c) wherein the ethylene-vinyl acetate-maleic anhydride terpolymer has been dynamically vulcanized in the presence of the other components using an epoxy crosslinking agent.

2. The composition according to claim 1 wherein the blend contains about 60 to 70 wt. % (a), about 10 to 20 wt. % (b), and about 10 to 20 wt. % (c).

3. The composition according to claim 1 wherein said thermoplastic polyolefin is selected from polyethylenes, polypropylenes, copolymers of ethylene and an alpha-olefin other than ethylene, copolymers of propylene and an alpha-olefin other than propylene, or mixtures thereof.

4. The composition according to claim 3 wherein said thermoplastic polyolefin is an impact resistant polymer of propylene and ethylene having a ethylene content of 15 to 20 % by weight.

5. The composition according to claim 1 wherein the rubber of (b) is an ethylene-propylene-diene terpolymer containing between about 50 to 80 weight % ethylene about 20 to 40 weight % propylene and about 3 to 10 weight % diene.

6. The composition according to claim 5 wherein said ethylene-propylene-diene terpolymer contains about 30 to 60 by weight of a paraffinic oil extender.

7. The composition according to claim 1 wherein said ethylene-vinyl acetate-maleic anhydride terpolymer is present in the composition as particles having an average particle size below about 50 μm.

8. The composition according to claim 7 wherein said ethylene-vinyl acetate-maleic anhydride terpolymer contains at least 50 mole % ethylene repeating units, up to 40 mole % vinyl acetate repeating units, and up to 10 mole % maleic anhydride repeating units.

9. The composition according to claim 8 wherein said ethylene-vinyl acetate-maleic anhydride terpolymer has a melt index from 5 to 20 g/10 min. at 190° C.

10. A cross linkable composition comprising:
(a) about 50 to 90 weight % of a thermoplastic polyolefin,
(b) about 5 to 40 weight % of a rubber that does not vulcanize in the presence of epoxy compounds
(c) about 5 to 30 weight % of at least one ethylene-vinyl acetate-maleic anhydride terpolymer, all percentages based on the total of (a), (b) and (c),
(d) about 1 to 20 parts per hundred parts of (c) of at least one epoxy of the formula

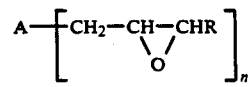

in which n is between 2 and 6 inclusive, A is a polyfunctional group of the valency of n, and R is a hydrocarbon radical or hydrogen; and (e) at least one tertiary amines wherein the ratio of epoxy to tertiary amine is about 1000:1 to 1:1.

11. The composition according to claim 10 wherein the epoxy is present in an amount between 1 and 10 parts per hundred of ethylene-vinyl acetate-maleic anhydride terpolymer, n is 2, 3 or 4, A is a polyhydroxy group and R is hydrogen.

12. The composition according to claim 10 wherein the tertiary amine is non volatile at processing conditions and is present in a concentration per epoxy between about 1:100 and 1:10; and epoxide equivalents in the epoxy/anhydride equivalents in the terpolymer is between about 0.1 and 1.

13. The composition according to claim 12 wherein the tertiary amine is selected from triethyl amine, tributyl amine, dimethylaniline or diazabicyclo [2.2.2]octane, and the epoxy is selected from polyglycidyl ethers of polyhydroxy compounds.

14. A process for producing a multi component thermoplastic elastomer comprising:
(1) mixing
(a) about 50 to 90 weight % of at least one thermoplastic polyolefin based on the total of (a), (b) and (c);
(b) about 5 to 45 weight % based on the total of (a), (b) and (c) of at least one rubber that does not vulcanize in the presence of epoxy compounds, and
(c) about 5 to 30 weight % based on tht total of (a), (b) and (c) of at least one ethylene-vinyl acetate-maleic anhydride terpolymer having a number average molecular weight of about 1,000 to 1,000,000 g/mole;
(d) about 1 to 20 parts per 100 parts (c) of at least one epoxy of the formula

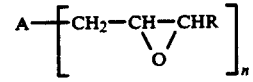

in which n is between 2 and 6 inclusive, A is a polyfunctional group of the valency of n, and R is a hydrocarbon radical or hydrogen; and (e) at least one tertiary amine wherein the ratio of epoxy to tertiary amine is about 1000:1 to 1:1, (2) heating this mixture at a sufficient temperature for a sufficient time to substantially cross link (c) without substantial decomposition, and form a uniform dispersion of small particles of (b) and crosslinked (c) in the polyolefin matrix (a).

* * * * *